United States Patent
Kraiczek

[11] Patent Number: 5,604,589
[45] Date of Patent: Feb. 18, 1997

[54] DIODE ARRAY SPECTROPHOTOMETER

[75] Inventor: Karsten Kraiczek, Karlsbad, Germany

[73] Assignee: Hewlett-Packard Company, Palo Alto, Calif.

[21] Appl. No.: 589,074

[22] Filed: Jan. 23, 1996

[30] Foreign Application Priority Data

Feb. 14, 1995 [DE] Germany .......... 195 04 834.2

[51] Int. Cl.⁶ .................. G01J 3/02; G01J 3/36
[52] U.S. Cl. .................................. 356/328
[58] Field of Search .................. 356/300, 319, 356/326, 328

[56] References Cited

U.S. PATENT DOCUMENTS

| | | | |
|---|---|---|---|
| 4,644,632 | 2/1987 | Machler et al. | 356/328 |
| 4,709,989 | 12/1987 | Mächler | 356/328 |
| 5,162,868 | 11/1992 | Ando | 356/326 |

OTHER PUBLICATIONS

Zeiss, H. Schlemmer et al., Jun. 1984, "Simultan–Spektrometer" (pp. 1–15) (in German).

*Primary Examiner*—F. L. Evans

[57] ABSTRACT

A diode array spectrophotometer has an entrance slit apparatus, a diffraction grating, a diode array and a casing to define the relative positions of the elements. The casing and the holder for accepting the diffraction grating are made of a ceramic whose coefficient of thermal expansion is matched to that of the diode array. The grating holder has a cylindrical outer surface and is situated within a conic-frustum-shaped opening of the casing. Between the grating holder and the conic-frustum-shaped opening, there are a plurality of filler elements which are made of ceramic or glass.

5 Claims, 1 Drawing Sheet

DIODE ARRAY SPECTROPHOTOMETER

FIELD OF THE INVENTION

The invention described here refers to a diode array spectrophotometer, the basic elements of which are an entrance slit apparatus, a diffraction grating, a diode array and a casing to define the spatial positions of these elements relative to one another. The invention especially concerns the adjustment and fixing of the diffraction grating relative to the entrance slit and the diode array.

BACKGROUND OF THE INVENTION

A diode array spectrophotometer with an entrance slit apparatus, a diffraction grating and a diode array images the entrance slit of the entrance slit apparatus onto the diode array via the diffraction grating. Beside the spectral division of light, the diffraction grating typically also has an imaging function corresponding to that of a concave mirror.

The photodiode array of a diode array spectrophotometer has a typical length of between about 12.5 mm and 25 mm, diode array lengths of about 25 mm normally being employed with higher-resolution instruments. A UV/VIS diode array spectrophotometer covers a wavelength range of 200 nm to 800 nm, giving a linear dispersion of about 40 nm/mm. Many fields of application require a wavelength reproducibility of less than 0.05 nm with a wavelength accuracy of better than 1 nm across a wide temperature range. This means that the mechanical and thermal stability of the arrangement of the entrance slit relative to the diffraction grating and to the diode array within the operating temperature range must lie in the submicrometer range, even when shocks and vibrations occur, as they unavoidably do in everyday use.

With a diode array spectrophotometer, it is also necessary while assembling the instrument to make adjustments to the positioning of the optical elements relative to one another, i.e. of the entrance slit relative to the diffraction grating and to the diode array. After conducting adjustments, the adjusted elements need to be fixed in such a manner that the mechanical and thermo-mechanical stability described above is achieved.

In order to minimize geometrical displacements due to the differing coefficients of thermal expansion of the optical components of a diode array spectrophotometer, U.S. Pat. No. 4,709,989 teaches that the spectrophotometer's casing can be made from a compressed ceramic material whose coefficient of thermal expansion is adapted to the coefficient of thermal expansion of the lenses used in the optical elements of the spectrophotometer.

U.S. Pat. No. 4,805,993 discloses an additional diode array spectrophotometer with a slit, a diode array and an optical grating, which are held relative to one another by a casing. For the purposes of adjusting and fixing the grating relative to the casing, the grating has a peg at the back, which is held by a manipulator during adjustment. The grating can be moved along the x and y axes using the layout plate and can also be rotated about these axes. To enable displacement in the z direction, the grating can be moved within the cylindrical opening in the layout plate. When the final adjustment position has been reached, the layout plate together with the grating is fixed relative to the casing using a self-hardening substance. The grating and the layout plates of the known diode array spectrophotometer are made of glass or ceramic. The structure described for adjusting and fixing the diffraction grating of the known diode array spectrophotometer using the plate arrangement described is complicated both to manufacture and to handle during the adjusting and fixing stages. With this known diode array spectrophotometer, a fine adjustment of the diode array must be carried out after the described adjustment of the grating, since not all degrees of freedom are available for adjusting the grating.

SUMMARY OF THE INVENTION

According to a first important aspect, the invention stems from the realization that, although the thermal compensation of the known spectrophotometer takes account of the behavior of the casing and the grating, it cannot compensate for the thermal expansion behavior of the diode array.

As will be described in detail below, the invention stems from the realization that the temperature dependency of the measured wavelength is minimized if the coefficient of thermal expansion of a grating holder, which holds the diffraction grating, is attached to the casing and defines an adjustable position of the diffraction grating relative to the entrance slit apparatus and the diode array, is adapted to the coefficient of thermal expansion of the diode array.

To this end, the invention provides a diode array spectrophotometer with an entrance slit apparatus, a diffraction grating, a diode array, a casing to define the positions of the entrance slit apparatus and the diode array relative to one another, and a grating holder attached to the casing to accept the diffraction grating, the holder being used to fix the diffraction grating in an adjusted position relative to the entrance slit apparatus and the diode array, whereby the casing and the grating holder are made of a ceramic or ceramics whose coefficient(s) of thermal expansion is/are adapted to the coefficient of thermal expansion of the diode array.

According to a preferred embodiment of the invention, a diode array spectrophotometer of the aforementioned type is provided in which the diode array is made of silicon and the ceramic has a coefficient of thermal expansion of $2.5 \times 10^{-6}$ $K^{-1}$.

According to a preferred embodiment of the invention, a diode array spectrophotometer of the aforementioned type is provided in which the ceramic is a silicate ceramic.

According to a further preferred embodiment of the invention, a diode array spectrophotometer of the aforementioned type is provided in which the silicate ceramic belongs to the three-component system $Al_2O_3$—$MgO$—$SiO_2$.

According to yet another preferred embodiment of the invention, a diode array spectrophotometer of the aforementioned type is provided in which the casing and the grating holder attached to the casing are made of the same ceramic.

Starting from the aforementioned known diode array spectrophotometer, a further important aspect of the invention is that it is based on the problem of implementing a diode array spectrophotometer with entrance slit apparatus, diffraction grating, diode array, and casing such that assembly of the spectrophotometer and adjustment of the diffraction grating is simplified while providing greater mechanical and thermo-mechanical stability for the completed arrangement.

To solve this problem, the invention provides a diode array spectrophotometer with an entrance slit apparatus; a diffraction grating; a diode array; a casing to define the positions of the entrance slit apparatus and the diode array relative to one another, an opening in the form of a conic frustum being provided in the casing; a grating holder to accept the diffraction grating, with an outer surface in the shape of a cylindrical sleeve; and at least three filler elements arranged between the wall of the conic-frustum-shaped opening and the outer surface of the grating holder.

According to a preferred embodiment of the invention, a diode array spectrophotometer of the aforementioned type is provided in which the filler elements are glued or braced both to the cylindrical outer surface of the grating holder and to the wall of the conic-frustum-shaped opening.

According to a preferred embodiment of the invention, a diode array spectrophotometer of the aforementioned type is provided in which each of the filler elements has a cylindrical base and a spherical top or is also spherically fitted to the grating holder, whereby a circular surface of the cylindrical base is glued or braced to the cylindrical outer surface of the grating holder and the spherical top is glued or braced to the wall of the conic-frustum-shaped opening.

According to a further preferred embodiment of the invention, a diode array spectrophotometer of the aforementioned type is provided in which the casing and the grating holder are made of a ceramic whose coefficient of thermal expansion matches that of the diode array.

According to yet another preferred embodiment of the invention, a diode array spectrophotometer of the aforementioned type is provided in which the grating holder and the casing are made of silicate ceramics.

According to yet another preferred embodiment of the invention, a diode array spectrophotometer of the aforementioned type is provided in which the filler elements are made of a glass whose coefficient of thermal expansion is essentially the same as that of the diode array.

According to yet another preferred embodiment of the invention, a diode array spectrophotometer of the aforementioned type is provided in which the filler elements are made of the same ceramic as the grating holder and the casing.

According to another preferred embodiment of the invention, a diode array spectrophotometer of the aforementioned type is provided in which two sets of filler elements are provided, where the filler elements of one set extend a greater distance between the circular surface and the spherical top than the filler elements of the other set.

In further overcoming the problem, the invention provides a method for adjusting and fixing a diffraction grating relative to an entrance slit apparatus and a diode array of a diode array spectrophotometer with the following steps:

providing a casing with a conic-frustum-shaped opening, fixing the entrance slit apparatus and the diode array relative to the casing, providing a grating holder with a cylindrical outer surface and a diffraction grating, arranging the grating holder within the conic-frustum-shaped opening of the casing, adjusting the position of the grating holder relative to the conic-frustum-shaped opening of the casing, introducing at least three filler elements into a gap in the casing between the cylindrical outer surface of the grating holder and the conic-frustum-shaped opening such that each filler element rests against both the cylindrical outer surface and the conic-frustum-shaped opening, and gluing the filler elements to the cylindrical outer surface and the conic-frustum-shaped opening.

In a preferred refinement of the method, the step of introducing the filler elements comprises the following substeps:

introducing a small number of filler elements into the gap in the casing between the cylindrical outer surface and the conic-frustum-shaped opening, provisionally fixing the grating holder relative to the casing by gluing this small number of filler elements using a fast-acting adhesive, introducing additional filler elements into the gap in the casing, and fixing the grating holder in its final position relative to the casing.

In a preferred refinement of the method, the gluing step comprises the use of a temperature-resistant adhesive.

In a preferred refinement of the method, the method includes the following additional step:

removing the filler elements used for provisional fixing from the gap in the casing.

BRIEF DESCRIPTION OF THE DRAWINGS

In the following, preferred embodiments of the invention are described in more detail with reference to the enclosed drawings.

DESCRIPTION OF THE PREFERRED
EMBODIMENT OF THE INVENTION

Figure 1:
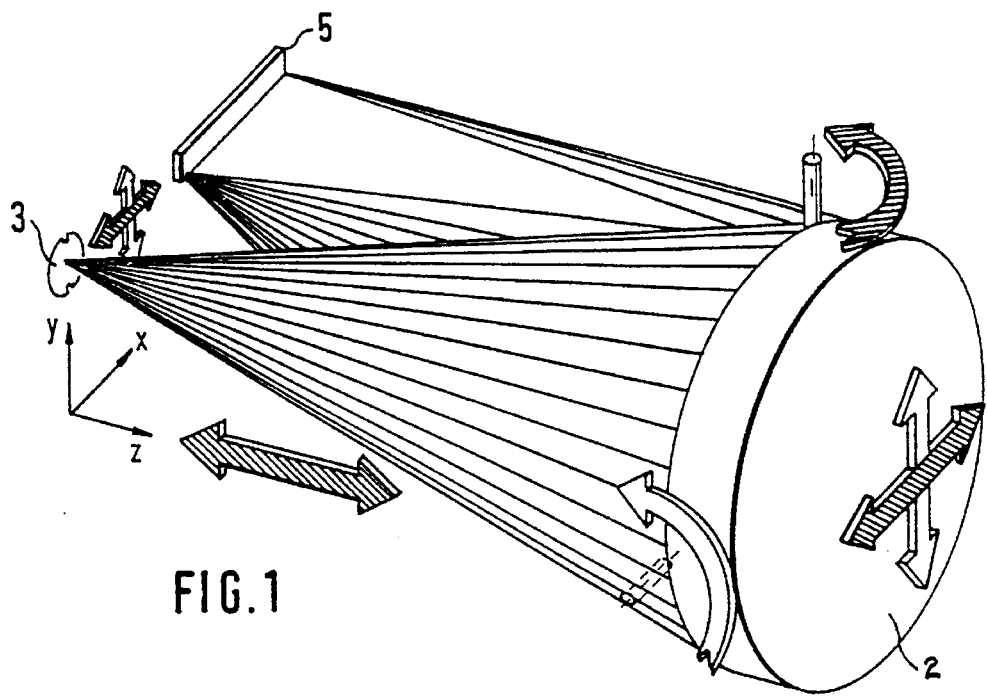
FIG. 1 is a schematic representation of the main functional elements of a diode array spectrophotometer.

FIG. 1 shows a diode array spectrophotometer with an optical apparatus 3 defining an entrance slit, hereafter called entrance slit apparatus 3, a diffraction grating 4 and a diode array 5.

Figure 2:
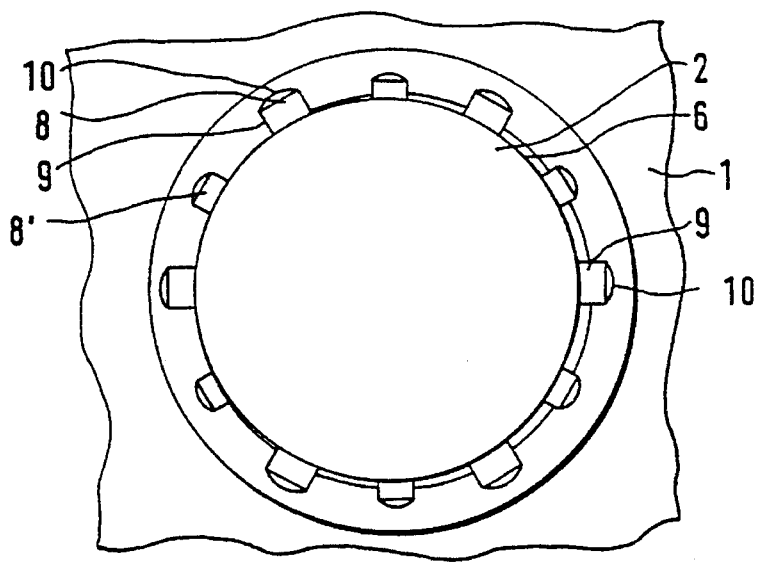
FIG. 2 is a plan-view representation of a grating holder for accepting a diffraction grating and fixing in an adjustable manner its position relative to a casing of the spectrophotometer.
Figure 3:
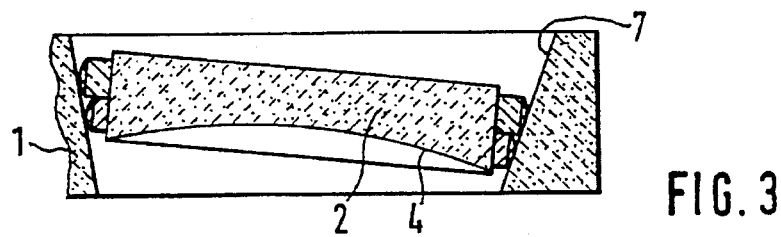
FIG. 3 is a representation of a vertical cross-section of the grating holder shown in FIG. 2.

For reasons of clarity, casing 1 is not shown in the schematic representation of FIG. 1, but rather only in FIG. 2 and 3. In a conventional manner per se, casing 1 serves to define the positions of entrance slit apparatus 3, diffraction grating 4 and diode array 5 relative to one another. In a per se conventional manner for diode array spectrophotometers, diffraction grating 4 images the entrance slit, which is defined by entrance slit apparatus 3, onto one of the elements of diode array 5, depending on the wavelength of the incident light. Entrance slit apparatus 3 and diode array 5 must be at certain positions in the x-y plane. Here, less critical adjustment errors along the y-axis are denoted by a light-colored arrow, while critical adjustment errors along the x-axis are denoted by a dark-colored arrow. Diffraction grating 4 must be correctly adjusted relative to its position in the x-y plane, its distance along the z-axis, and its swivel direction about both the x- and y-axes. Here, too, the relevant critical adjustments are denoted by a dark-colored arrow, the less critical adjustments by a light-colored arrow, and the moderately critical adjustments by a hatched arrow.

The invention further teaches that, when selecting the coefficients of thermal expansion, it is necessary to start from the coefficient of thermal expansion of the diode array as the target coefficient of thermal expansion, and, by selecting suitable materials for the relevant pads, to adapt to this target coefficient of thermal expansion the coefficients of thermal expansion for the elements contributing essentially to the thermal behavior.

According to the invention, it is recognized that the coefficient of thermal expansion of the grating holder has a major influence on the geometry of the grating arrangement, and that in addition the coefficient of thermal expansion of the casing dictates the geometry. Thus, according to what the invention teaches, temperature errors are minimized by adapting the coefficients of thermal expansion of the casing, the grating holder and the diode array to one another. Since the diode array is typically made from silicon, its coefficient of thermal expansion is typically $2.5 \times 10^{-6}$ $K^{-1}$.

The invention therefore teaches that the casing and the grating holder are manufactured from a ceramic whose coefficient of thermal expansion is as close as possible to that of silicon. This represents a considerable departure from the prior art, which teaches that, when selecting the material for the casing, conformance to the coefficient of thermal expansion of the lenses customarily used in the optics is required, in the case of material ZKN-7 about $5 \times 10^{-6}$ $K^{-1}$. The coefficient of thermal expansion valid for the relevant parts of the object of the invention is therefore reduced by a factor of two compared to the prior art.

According to the invention, a silicate ceramic from the three-component system $Al_2O_3$—$MgO$—$SiO_2$ is employed as the material for casing 1 and grating holder 2. The diffraction grating 4 forms a single unit together with the grating holder. The ceramic can be adapted in a manner known per se to a coefficient of thermal expansion of $2.5 \times 10^{-6}$ $K^{-1}$ by selecting a specific mix ratio. Using the dry press method, casing 1 and grating holder 2 can be manufactured cost effectively from this silicate ceramic.

An especially simple, precisely adjustable and thermally stable embodiment of the grating holder will be described in the following in more detail with reference to FIGS. 2 and 3.

Casing 1 has an opening 7 in the form of a conic frustum, which diverges towards the outside of the casing. As previously mentioned, casing 1 is made of a silicate ceramic.

Grating holder 2, which is also made from this silicate ceramic, consists essentially of a flat, cylindrical body with a cylindrical outer surface 6, the body fixing a diffraction grating 4, similar to a concave mirror, to one of its main faces. Between the cylindrical outer surface 6 of grating holder 2 and the wall of conic-frustum-shaped opening 7, there are a plurality of filler elements 8, 8'. In the preferred embodiment shown, the filler elements have a cylindrical base 9 and a spherical top 10. The filler elements are preferably made of the same ceramic as grating holder 2 and casing 1. However, it is also possible to manufacture the filler elements from glass.

When assembling the diode array spectrophotometer, entrance slit apparatus 3 and diode array 5 are first glued into the recesses provided in the casing 1 (not shown) for this purpose, or are mechanically fixed in a suitable manner. Thus they are fixed without adjustment.

Next, grating holder 2 is inserted into opening 7 using either a collet or a vacuum suction device and adjusted, the gap in the casing between conic-frustum-shaped opening 7 and cylindrical sleeve 6 being approximately uniform in size. Here, the electrical readouts from diode array 5 are used during the adjustment process.

Next, using a small number of filler elements 8, for example three, provisional fixing is attained by coating the elements with a fast-acting adhesive and inserting them between cylindrical wall 6 of grating holder 2 and the wall of conic-frustum-shaped opening 7, with their flattened bases resting against cylindrical wall 6 and their spherical tops 10 resting against the wall of conic-frustum-shaped opening 7.

After this provisional fixing, the desired number of additional filler elements 8, 8' are inserted at a prescribed angular separation into the described gap between the casing and the grating holder. Preferably, filler elements 8, 8' with at least two different axis lengths are used, in order to define two physically separated series of filler elements for fixing, in the manner shown in FIG. 3. These filler elements are coated with an adhesive which hardens under UV light and has a so-called glass temperature TG distinctly higher than the highest operating temperature of the spectrophotometer. A glass transition temperature TD of 140° C. is considered correct.

Hardening under UV light is conducted in the vertical adjustment position sketched in FIG. 3 by exposing the arrangement to UV light directed toward the upper surface. In order to harden the adhesive evenly with UV light, it is considered practical to manufacture the filler elements from glass.

However, when refraining from hardening the adhesive with UV light, it is preferable to employ ceramic filler elements.

In contrast to the described embodiment, it is possible to use spherical filler elements 8, 8' In this case, low-quality balls, i.e. with a low degree of spherical concentricity, can be used, since this does not affect the accuracy of the adjustment.

I claim:

1. A diode array spectrophotometer comprising:
   an entrance slit apparatus;
   a diffraction grating;
   a diode array;
   a casing for defining positions of the entrance slit apparatus and the diode array relative to one another; and
   a grating holder fixed to the casing for receiving the diffraction grating, by means of which the diffraction grating is fixed relative to the entrance slit apparatus and the diode array in an adjusted position, the casing and the grating holder comprised of ceramics having coefficients of thermal expansion which are matched to the coefficient of thermal expansion of the diode array.

2. A diode array spectrophotometer as recited in claim 1, wherein the diode array is comprised of silicon and wherein the ceramics have a coefficient of thermal expansion of $2.5 \times 10^{-6} K^{-1}$.

3. A diode array spectrophotometer as recited in claim 2, wherein the ceramics are comprised of silicate ceramics.

4. A diode array spectrophotometer as recited in claim 3, wherein the silicate ceramics belongs to the three-component system $Al_2O_3$—$MgO$—$SiO_2$.

5. A diode array spectrophotometer as recited in claim 1, wherein the casing and the grating holder fixed to the casing consist of the same ceramics.

\* \* \* \* \*